April 7, 1953     P. L. TORRENCE     2,633,711
PARKING BRAKE VALVE AND PRESSUE COMPENSATOR
Filed Nov. 28, 1950
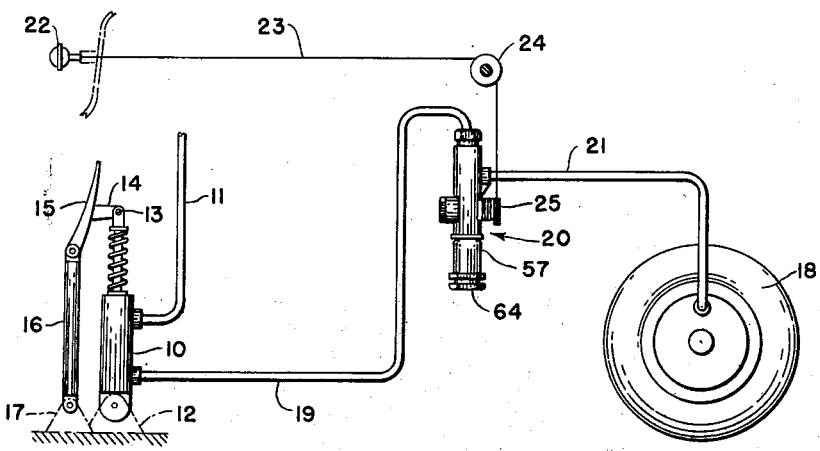
Fig. 1
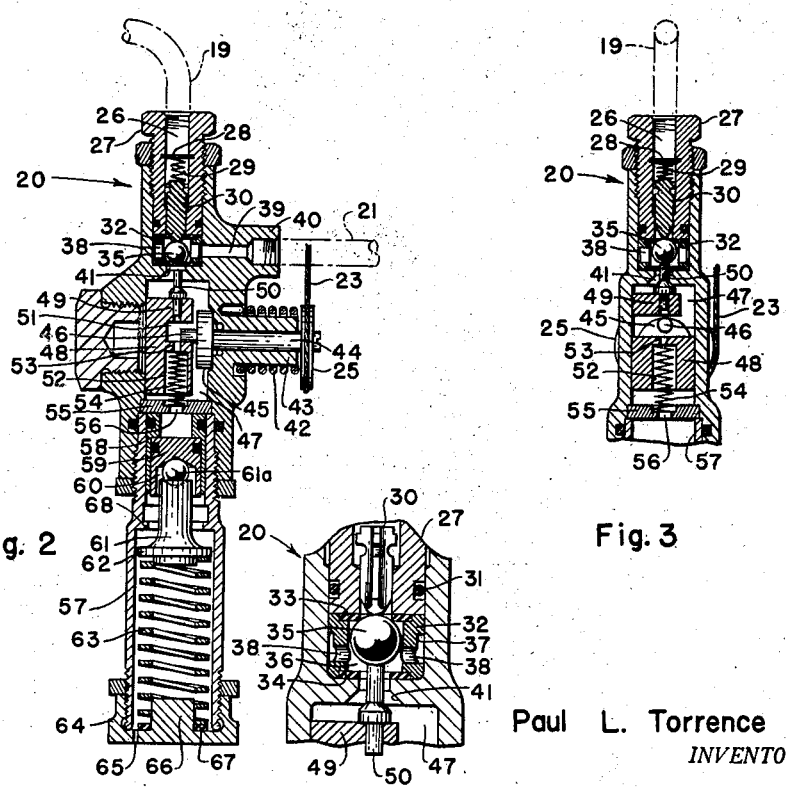
Paul L. Torrence
*INVENTOR.*
HIS    PATENT    AGENT.

Patented Apr. 7, 1953

2,633,711

UNITED STATES PATENT OFFICE 2,633,711

PARKING BRAKE VALVE AND PRESSURE COMPENSATOR

Paul L. Torrence, Huntington Park, Calif., assignor to North American Aviation, Inc.

Application November 28, 1950, Serial No. 197,912

7 Claims. (Cl. 60—54.5)

This invention relates to hydraulic brake systems and more particularly to a control valve and compensator unit for use therein to allow hydraulic fluid to be maintained under pressure in the brake motors for parking purposes.

An object of the invention is to provide an improved hydraulic parking brake valve and compensator wherein means are provided for maintaining the brakes applied during parking periods regardless of variations in volume of the hydraulic fluid.

A further object is to provide a valve of this type which after being set by the operator to trap a supply of fluid in the brake motors, can be released to allow the brake hydraulic system to return to normal condition merely by the operator actuating the brake system in normal fashion to build-up the pressure therein to a level above that of the trapped supply in the brake motors.

Still another and important object is to provide means in the compensator element whereby a reserve margin will be available so that even though the pressure of the trapped working fluid under parking conditions may be further increased, such as by thermal expansion induced by temperature changes in the ambient atmosphere, locking of the brake system will not occur but rather release can be obtained merely by the operator exerting sufficient pressure on the brake pedals to raise the system pressure above the existing level of pressure in the trapped portion of the system.

Another object is to provide a compensator unit in a parking brake valve which will provide for two stages of pressure response; the lower range of response being intended to be employed under normal operating conditions and the higher range serving to permit continued operation of the brake system under certain abnormal conditions.

Other objects of the invention will become apparent from the following description when considered in conjunction with the accompanying drawing, in which:

Figure 1 is a schematic view illustrating the valve of this invention installed in an hydraulic brake system;

Figure 2 is a cross-sectional view showing the detailed interior construction of the subject parking brake valve and compensator unit;

Figure 3 is a partial cross-sectional view taken at right angles to that of Figure 2 and showing certain of the parts in their alternate operating positions; and Figure 4 is an enlargement of a portion of Figure 3.

Referring to the drawing and beginning with Figure 1, there is disclosed a showing of a simplified brake system of hydraulic type such as might be employed in aircraft. In this figure the numeral 10 designates a master brake cylinder of known type which may be connected by a pipe line 11 to some suitable source or supply of hydraulic brake fluid. The master brake cylinder is shown as being pivotally mounted as at 12 and having a pivotal connection 13, at the end of its spring-pressed operating plunger, to a horn or fixed link 14 extending from a foot operated pedal 15 pivotally mounted at the end of a lever 16 used to operate other instrumentalities in the vehicle and which itself is pivotally mounted as at 17.

With the arrangement as shown, actuation of the pedal 15 in turn causes actuation of the master cylinder 10 and in consequence pressure is built-up in the operating fluid contained therein in known manner, this pressure being controllable in amount by the operator and serving as the means of actuating the hydraulic brake motors mounted on the vehicle wheels, one of which is designated by the numeral 18 in the drawings.

Leading out of the pressure chamber of the master brake cylinder is a pipe line 19 which connects to the upper end of the parking brake valve 20 which in turn is connected to the brake motor of the wheel 18 by a third pipe line 21. Under normal intermittent braking operations, the valve and compensator unit 20 exerts no influence on the braking system and to all intents and purposes the system operates as though the pipe lines 19 and 21 were one continuous line running from the master cylinder 10 to the brakes.

However normal brake system operation may be modified to permit continuous and unattended application of the brakes for parking purposes and control of this phase of operation may be initiated by the operator through a pull-cable control terminating in the operator's cab or cockpit. As shown in the drawings, such a cable control may comprise an operating knob 22 affixed to the end of a cable 23 which after passing through suitable supports and over any necessary directional guide means such as a pulley 24, connects to a cable drum or sector member 25 associated with the parking valve 20.

Referring more particularly to the details of Figure 2 et seq., pressure fluid from the master cylinder 10 enters the parking brake valve 20 from the line 19 attached at port 26 and flows downwardly therefrom through the central bore of a nipple 27 past a C-ring 28 set into a groove in the wall thereof to retain and form an abutment for a spring 29. This spring bears on the upper end of a fluted plunger 30 also contained in the bore and slidable therein against the reaction of the spring. Due to the fluting of this plunger 30, it offers no consequential obstruction to the passage of hydraulic fluid through the bore since the same may pass downwardly around the exterior of the plunger and between the flutes as can be seen in Figure 4.

The nipple 27 is screw threaded into the body of the unit 20 and is sealed by an O-ring 31. The bore in which this nipple is contained extends below the bottom end of the nipple to form a cylindrical cavity in which is contained a cage-like insert 32. Set into recesses in the top and bottom surfaces of the insert 32 are sealing washers 33 and 34 which form valve seats for alternate contact by a valve element 35 which may be of spherical form and which is centrally confined within the cage in a valve chamber 36. This cage insert has a circumferential groove 37 in its outer cylindrical surface which is intersected by a series of radial ports 38 and, from the location of this groove when installed in the unit 20, a bore 39 extends radially outward to a port 40 to which is connected the pipe line 21. Thus hydraulic fluid flowing downwardly past the plunger 30 upon displacement from the master cylinder, can enter the central core space of the insert 32 and, if the valve element 35 is in the position shown in Figure 1, can then flow outwardly therefrom through the radial ports 38 to enter the bore 39 and thence by traversing the pipe line 21 can reach the brakes.

Normally the action of the spring 29 on the plunger 30 forces it downwardly so that by its contact with valve element 35, it forces the latter into engagement with its lower valve seat 34. This sealing off of the opening 41 prevents flow of hydraulic fluid under pressure down into the remainder of the interior of the valve unit 20 which contains the mechanism for controlling the parking valve and also that constituting the pressure compensator.

Returning to consideration of the parking brake valve control cable 23 which, as previously stated terminates in operative connection with a drum 25, it should be observed that this cable is rigged with an initial tension that is maintained by a coil spring 42 fastened at one end to the drum 25 and at its other end to the body of the valve unit 20. This spring surrounds a projecting boss 43 which in turn surrounds and supports a stub shaft 44. With the spring 42 installed and the cable 23 rigged to the drum 25, the design of the spring is such that a pull on the cable 23 causing drum 25 to rotate counterclockwise as viewed in Figure 3 through an angle of 90° will cause the convolutions of the spring to draw up tight and thus act as a stop to limit the movement of cable 23. The drum 25 is operatively affixed to the externally projecting end of shaft 44 which at its other end carries a disc 45 having a projecting pin 46 eccentrically mounted thereon. These two last named parts are disposed in a cavity 47 in the valve body 20. Also contained in this cavity is a reciprocable plunger 48 formed at its upper part with an overhanging arm or ledge portion 49 supporting a pin 50 centrally located within the body of the valve unit 20 to be reciprocable along the longitudinal axis thereof. This pin is so designed in its dimension and placement that near the upper limit of its travel it will contact the valve element 35 and force it from its seat 34 and into contact with the alternate seat 33.

The reciprocable plunger 48 has a groove 51 running transversely across the side facing the disc 45 and this groove receives the pin 46 carried by the disc. Also below the groove 51, the plunger has a bore 52 running upwardly from the bottom face as shown in Figures 2 and 3. This bore is continued on into the groove 51 by means of a bore section 53 of considerably reduced diameter. The main portion of this bore contains a coil spring 54, the lower end of which is seated in a circular recess in a transverse bulkhead 55 constituting the lower wall of the cavity 47. The spring 54 is intended to provide an upward force on the plunger 48 and consequently on the pin 50 to force the valve element 35 upwardly. However actual movement of the plunger is either prevented or permitted by the pin 46 depending upon its rotational setting as determined by the control cable 23. In the rotational position shown in Figure 2, the pin 46 is bearing on the lower side of the groove 51 and consequently the plunger is prevented from moving upwardly under the urging of spring 54. On the other hand in the rotational position of the disc 45 shown in Figure 3, the pin is out of contact with the walls of the groove 51 and consequently the plunger 48 is free to move up to the limit imposed by valve element 35 upon reaching its upper seat 33.

Referring again more particularly to Figure 2, the aforementioned bulkhead 55 has an aperture 56 extending therethrough in the longitudinal direction and it is retained in place against an internal shoulder in the valve body by the upper end of the pressure compensator unit body 57. As shown, the generally cylindrical hollow body 57 is screw threaded at its upper end into the lower end of the valve body, there being suitable O-ring seal means in the joint to effectively seal against the relatively high pressures to which the same is subjected. Contained within the upper end of the body 57 is a compound piston consisting of concentric interfitting piston elements 58 and 59. The outermost piston element 58 is of ring form having an internal shoulder near its upper end to overlie the top face of the second piston element 59 which thus operates within the first, there being an O-ring seal between the two. Also there is an O-ring seal set into a groove in the outer piston element to contact the inner wall of the body 57. In contrast, the inner piston element 59 is of generally solid construction although it has a cavity 60 in its under surface receiving the upper end of a plunger 61, there being a ball-bearing element 61a retained in bearing engagement between the upper conical wall of the cavity 60 and the upper conical end face of the plunger 61. The lower end of this plunger 61 has a projecting flange 62 forming a seat for the upper end of a coil spring 63 which at its lower end is received in a dished end cap 64 screw-threadedly attached to the lower end of the compensator body 57. This end cap has an atmospheric vent 65 and an upwardly projecting integral plug 66 provided to be surrounded by the lower end of spring 63 and to retain adjustment shims such as 67 of washer form. Furthermore it might be mentioned that the cylindrical body 57 is formed internally with a constriction or annular shoulder 68 serving as a stop to limit downward movement of the piston element 58. In this connection it may be stated that the spring 63 is designed to have special compression characteristics and that the two-part piston 58—59 is intended to provide for two stages of operation in its functioning to provide pressure compensation for the parking brake system.

As previously indicated, the fluid pressure accumulator and compensator portion of the unit 20 is contained within the generally cylindrical casing portion 57 below the apertured bulkhead 55. Whenever the brake fluid under pressure passes through the aperture 56 in this bulkhead it acts upon the two-part piston 58—59 and when the pressure is of sufficient magnitude, dependent mainly upon the design of spring 63, the piston will be forced to move downwardly from the position shown in Figure 2. By way of illustration, the spring 63 might have such a characteristic that it would begin to compress when the fluid pressure acting on the piston rose to approximately 244 pounds per square inch. Initially the piston elements 58 and 59 would move downwardly together and under increasing pressure the outer piston element would contact the annular stop 68 at a pressure level of approximately 610 pounds per square inch. Thus the range of pressures between 244 p. s. i. and 610 p. s. i. might constitute the normal working range of pressures for the brake system and under this pattern as long as the pressure acting on the piston of the compensator is maintained near to or above the 244 p. s. i. level, any rise of pressure due to temperature changes affecting the system can be automatically compensated by the action of the piston in further compressing the spring to thereby increase the volumetric capacity of the brake system. Furthermore with pressures above the 244 p. s. i. level, any decrease of pressure due to shrinkage in volume of the working fluid due either to a temperature drop or to loss by leakage can be compensated by automatic upward movement of the piston caused by expansion of the spring 63.

In hydraulic brake systems of the present type including a compensator unit, the upper figure of the normal operating pressure range may be attained and the system placed in the condition for parking with the pressure at or very close to this level which has previously been illustratively set at 610 p. s. i. Under that condition it may be that a temperature rise would occur and the resultant pressure rise would cause hydraulic blocking of the system by acting on the parking valve so that the operator would be unable to bring about release of the brakes. In order to prevent this situation from arising, the provision of the two stage operation of piston 58—59 has been included. Remembering that at the 610 p. s. i. level the piston element 58 has reached the lower limit of possible movement, the accumulator would then have no further capacity for accepting additional hydraulic fluid were it not for the provision of the second piston element 59 which when subjected to sufficient pressure is free to further compress the spring 63. It should be noted that the inner piston element 59 has a piston face area less than that provided by the combined area of elements 58 and 59. Thus the pressure that will be sufficient to cause displacement of the second piston element 59 after the first has been stopped at the 610 p. s. i. level will differ by a substantial increment, say about 200 p. s. i. Therefore it would require a pressure of about 800 p. s. i. for this purpose making the second stage of accumulator action range from this figure up to the limit of movement of the second piston element as determined by the practical limit of spring compression. This might require approximately 1200 p. s. i. to accomplish.

In connection with the operation of the brake system incorporating the subject parking valve and compensator, it is possible to carry out the setting of the brakes for parking using either of two somewhat different sequences. Following one method, the operating knob 22 is first pulled causing rotation of drum 25 and through it rotation of the disc 45 and the pin 46 which it carries, moving it to the position shown in Fig. 3 against the limiting resistance of spiral spring 42. In this position, the plunger 48 is released by the pin 46 moving away from contact therewith which permits the spring 54 to lift the plunger and through pin 50 raise the valve element 35 upwardly to contact the upper seat 33 and at the same time force the plunger 30 upwardly against the reaction of the spring 29, which is designed to a lower strength specification than the spring 54 so that the latter can prevail in seating the valve. Under this condition the valve element 35 is held against the valve seat merely by the action of the spring 54. As the second step in this sequence, pressure is applied to the brake pedal by the operator to cause generation of pressure in the master cylinder 10 which is transmitted to the parking valve unit 20 through the pipe line 19 and the accompanying displacement of fluid moving downwardly past the plunger 30 forces the valve element 35 away from the upper seat and then flows on to the brake motor moving out through the port 40 and line 21. At the same time a part of the flow can pass downwardly through the aperture 41 and through chamber 47, through the second aperture 56 and into the accumulator chamber where it will be effective, if the pressure gradient is high enough, to displace the two-part piston 58—59 and thus cause compression of the spring 63. As the third step, pressure on the brake pedal is released, removing pressure at the port 26 so that the spring 54 again is effective to force the valve element 35 against this upper seat to thus leave a quantity of pressurized fluid trapped in the brake motor and the compensator unit. As the fourth and final step, the control knob 22 is released and then the spiral spring 42 is free to rotate the disc 45 and pin 46 back to the position shown in Fig. 2, which, of course, will require an accompanying downward movement of the plunger 48 against the reaction of spring 54. After this has been accomplished, the pressure trapped within the compensator will be effective to retain the valve element 35 securely against the upper seat 33. In order to accomplish release of the brakes after they have thus been set, it is merely necessary to re-impose pressure on the brake pedal in sufficient amount to overcome the net pressure acting on the valve element 35, the releasing pressure being assisted by the action of the spring 29.

The alternate sequence of operation which probably would be used when setting the brakes with the engines running, assuming that the installation is made in an airplane, would be first, the application of pressure to the brake pedals to cause engagement of the brakes, this pressure being held by the operator while the second step is being performed. In the second phase, the control handle 22 is pulled causing rotation of drum 25 and through it the pin 46 which in turn releases the plunger 48 so that the pin 50 will rise to contact the valve element 35 as before, with the force imparted by the spring 54. The strength of this spring, however, is not sufficient to overcome the fluid pressure retaining the valve element on seat 34. Completion of the rotation of disc 45 to the limit position shown in Fig. 3, however, causes the pin 46 to engage the upper face of the groove 51 and to thereby force the plunger 48 upwardly to mechanically force the valve element off its lower seat. The spring then becomes effective to move the valve element the remaining distance necessary to seat it against the upper seat 33, in which position the pin 46 no longer contacts the upper face of the groove 51. During this operation, the fluid under pressure has been enabled to enter the compensator unit and cause displacement of the two-part piston therein. The remainder of the sequence is then the same as previously described, that is, release of pedal force followed by release of the control knob 22.

Due to the unique construction of the subject parking valve and compensator, several distinct advantages are realized. First, the parking brake control may be operated while the brakes are under pressure, or, as heretofore indicated, this control may be operated first without pressure in the brake motors. Secondly, the check valve element 35 is only seated by spring forces. No direct mechanical means exists by which it would be possible to apply excessive force thereto with consequent loss of pressure or possible damage to the valve seats or other parts. Thirdly, direct mechanical means is provided to unseat the check valve but limited travel prevents direct contact with the opposite valve seat. Fourthly, the provision of a two-stage type of accumulator and thermal compensator minimizes the possibility of applying excessive brake pressure which may subsequently substantially allow the compensator spring to "bottom" under thermal expansion rendering it extremely difficult if not impossible to apply sufficient pedal pressure to unseat the check valve so that release of the brakes may occur.

While a particular form of this invention has been shown for purposes of illustration, it is obvious that modifications of form and detail can be made within the spirit and scope of the appended claims.

I claim as my invention:

1. A fluid pressure control device having a chamber therein equipped with an outlet, primary means for supplying fluid under pressure to said chamber and outlet, auxiliary means for supplying fluid under pressure to said chamber and outlet, a double acting valve controlling the inlets to said chamber, valve seats associated with said inlets, spring means acting on opposite sides of said double-acting valve, a plunger having limited movement disposed in one of said inlets adapted to be moved by one of said springs to move the valve off of the valve seat associated with that inlet, one of said spring means being designed to exert a spring force sufficient in magnitude to overcome that of the other, an interponent having limited movement disposed adjacent the other said inlet to be acted upon by the other of said springs, the said interponent being adapted to act upon the valve in opposition to the force exerted by the plunger, and manually actuatable control means arranged to restrain the action of the stronger of said spring means so that the other can unopposedly act upon the valve to effect a seating thereof.

2. A fluid pressure control device having a chamber therein equipped with an outlet, primary means for supplying fluid under pressure to said chamber and outlet, auxiliary means for supplying fluid under pressure to said chamber and outlet, the said auxiliary means comprising an accumulator unit having an expansible chamber for containing a quantity of fluid under pressure therein, a pressure responsive, displaceable end wall for said chamber, the said end wall having portions individually responsive to different pressure ranges, valve means controlling the inlets to the valve chamber from the primary and auxiliary means for supplying fluid under pressure, and means for controlling the operation of the valve means.

3. In a parking brake control valve, an accumulator comprising an expansible chamber for containing a quantity of fluid under pressure, a displaceable diaphragm constituting a boundary wall for said chamber, the said diaphragm having relatively movable portions collectively displaceable upon the initial application of pressure to said chamber, means to limit displacement of one of said portions and the other of said portions being adapted for further displacement beyond the range of said first portion upon continued application of pressure to said chamber.

4. In a parking brake control valve, an accumulator comprising an expansible chamber for receiving a fluid under pressure, a displaceable piston-like member constituting a boundary wall for said chamber, the said member having relatively movable portions displaceable upon the application of pressure to said chamber, means resiliently resisting displacement of the piston-like member, a first portion of said member having an area subjected to chamber pressure, means to limit displacement of said first portion, and a second portion of said member having an area subjected to chamber pressure the two portions being adapted for movement together within the limit of displacement of the first portion under the total force applied by pressure existing on their separate areas, and the second portion being thereafter displaceable a further distance by force developed by the pressure existing on its pressure area.

5. A fluid pressure control device having a chamber therein equipped with an outlet, primary means for supplying fluid under pressure to said chamber and outlet, auxiliary means for supplying fluid under pressure to said chamber and outlet, inlets to said chamber serving the primary and auxiliary means, the said auxiliary means comprising an expansible chamber for containing a quantity of fluid under pressure, a displaceable piston-like member constituting a boundary wall for said expansible chamber, the said displaceable member having relatively movable portions collectively displaceable upon the initial application of pressure to said expansible chamber, means to limit displacement of one of said portions, another of said portions being adapted for further displacement beyond the range of said first portion upon continued application of pressure to said expansible chamber, valve means controlling the inlets to the first said chamber, valve seats associated with the said inlets, force means normally holding the valve in contact with one of said seats, and releasable means adapted to act upon the valve means for causing movement of the valve in opposition to the force means and to thereby move the valve to close off the other of said inlets, the said releasable means including a spring actuated valve operator adapted to move the valve from one operative position to another and a direct mechanical connection to said operator adapted to impart a force to the valve to cause unseating thereof.

6. A fluid pressure control device having a chamber therein equipped with an outlet, a source for supplying fluid under pressure to said chamber and outlet, auxiliary means dependent upon the source organized to supply fluid under pressure to said chamber and outlet, the said auxiliary means comprising an expansible chamber for containing a quantity of fluid under pressure, a displaceable diaphragm constituting a boundary wall for said chamber, the said diaphragm having relatively movable portions collectively displaceable upon the initial application of pressure to said chamber, means to limit displacement of one of said portions with the other of said portions being adapted for further displacement beyond the range of said first portion upon continued application of pressure to said expansible chamber, valve seats associated with the first said chamber constituting inlets from the pressure sources, a double acting valve controlling the said inlet, force means normally holding the valve in contact with one of said inlet seats, and manually releasable means adapted to act upon said valve in opposition to said force means for causing movement of the valve into contact with the other of said inlet seats.

7. In a brake control valve adapted to provide for normal intermittent brake operation and in addition, continuous actuation of the brakes for parking, a pressure chamber having a first fluid connection adapted for coupling to a brake-line, second and third fluid connections respectively adapted for connection to alternate sources of pressure, a unitary valve element adapted to control the second and third fluid connections, means acting to cause the valve to close off one of said connections, a spring operated interponent adapted to overcome said means to thereby shift the valve to close off the other fluid connection, blocking means normally preventing valve shifting movement of the interponent, the said blocking means being operable in sequence to release the interponent for operation, to initially apply force tending to move the interponent, and to thereafter disengage the interponent, and means for operating the blocking means.

PAUL L. TORRENCE.

REFERENCES CITED

The following references are of record in the file of this patent:

UNITED STATES PATENTS

| Number | Name | Date |
| --- | --- | --- |
| 2,322,062 | Schnell | June 15, 1943 |
| 2,343,809 | Schnell | Mar. 7, 1944 |
| 2,466,224 | Frank et al. | Apr. 5, 1949 |